Patented July 14, 1953

2,645,625

UNITED STATES PATENT OFFICE 2,645,625

METHODS OF CONCENTRATING SOLUTIONS

Francis A. Bonzagni, Winthrop, Mass., assignor to Monsanto Chemical Company, St. Louis, Mo., a corporation of Delaware No Drawing. Application October 31, 1951, Serial No. 254,210

9 Claims. (Cl. 260—29.4)

The present invention relates to improved methods of concentrating solutions of methyl ethers of melamine-formaldehyde and/or methyl ethers of urea-formaldehyde condensation products, and to the concentrated solutions prepared thereby.

It is one object of the present invention to provide a simple and efficient method of concentrating solutions consisting essentially of methyl ethers of methylol melamines and/or methyl ethers of methylol ureas, water, free formaldehyde and unreacted methylating agent to a very high solids content without substantially polymerizing such methyl ethers.

A further object of the present invention is the preparation of clear, concentrated solutions of hydrophilic methyl ethers of methylol melamines and/or methyl ethers of methylol ureas which contain less than about 1.5% of free or uncombined formaldehyde.

Other objects and advantages of the present invention will appear from the following description and the appended claims.

In general, the present invention is carried out by first evaporating water, unreacted formaldehyde and unreacted methylating agent from a relatively dilute alkaline reacting solution consisting essentially of such liquids and hydrophilic methyl ethers of melamine-formaldehyde and/or methyl ethers of urea formaldehyde condensation products at a sufficiently rapid rate to bring the solution to a high solids content without substantial polymerization of the methyl ethers contained therein. In essence the initial solution of such condensation products is heated under conditions of turbulent flow and is concentrated within a period of about 5 minutes to a sufficiently high solids content to insure the removal of all but 1.5% or less of free formaldehyde and all but 5% or less of unreacted methanol from the solution while the vapors formed from the liquid components of the solution are in intimate contact with the interface of the remainder of the solution, after which the heating is discontinued before the condensation product is converted to the hydrophobe state. Satisfactory results are obtained when the solution is raised to a temperature of at least 100° C. but not in excess of 125° C. at atmospheric pressure under conditions of turbulent flow and the solution is concentrated to the desired extent within a period of not more than 5 minutes. As soon as the solution has been concentrated to the necessary solids content, that is, until it contains between about 70 to 95% by weight solids, it is separated from the vapor phase in contact therewith prior to appreciable condensation of the vapor phase. The separation of the vapor from the solution is preferably carried out as rapidly and completely as possible in order to avoid condensation of the vapor while it is still in contact with the solution otherwise dilution of the solution with free formaldehyde or unreacted methylating agent is apt to occur.

The concentrated solution of condensation product is generally too viscous when cold to be utilized satisfactorily and, in addition, will often become cloudy on standing. The high viscosity of the solution when cold is due primarily to its high solids content, which may vary between about 70 and 95% solids by weight depending upon the duration of the concentrating step and the quantity of free formaldehyde and unreacted methanol which it is desired to remove from the solution. On the other hand, the cloudiness of the solution on standing is probably attributable to inorganic salts and organic impurities which though soluble at higher temperature, become insoluble as the solution temperature decreases. Such organic impurities in the case of melamine condensation products may consist of unreacted melamine, impurities present in the melamine employed, decomposition products and deamination products of melamine and other amino compounds and the like, and hydrophobic reaction products of formaldehyde and methylating agent with such impurities. The impurities in the concentrated solutions of methyl ethers of urea-formaldehyde condensation products on the other hand consist in general essentially of inorganic salts and only a minor proportion of organic impurities.

It has also been found in accordance with the present invention that when the solids content of the concentrated solution of condensation product is reduced by dilution with water to a solids content between about 70 to 85% by weight solids and preferably between about 74 to 80% by weight solids, a solution is obtained which possesses satisfactory handling characteristics and is capable of being filtered or ultra-centrifuged to remove the haze or cloud-forming organic and inorganic impurities. If the presence of an alcohol in the solution is not objectionable a water-miscible alcohol such as methanol, ethanol, propanol and the like may be used instead of the water for diluting the concentrated solution to the solids content described immediately above. In general, the haze or cloud-forming impurities do not develop or become noticeable until the diluted solution has been standing for a considerable period of time, for example, from 12 to 24 hours or longer. Therefore, it is generally desirable to allow the solution to stand for a period of at least 24 hours before filtering or centrifuging in order to avoid the necessity of repeating such separating steps. Occasionally it may not be possible to remove the haze or cloud sufficiently by centrifuging and it is generally necessary in such instances to complete the clarification of the solution by filtering.

Solutions prepared in the foregoing manner are quite clear and remain clear even after standing for prolonged periods of time, for example, up to 6 months and longer. These solutions are capable of being diluted with water without precipitation of the condensation product and are especially suitable for use in improving the dimensional stability of textile materials. Moreover, when such solutions are obtained by diluting the concentrated solutions with water they contain less than 1.5% of free formaldehyde and less than 5% of methanol.

It is essential in the practice of the present invention to carry out the concentration of the initial solution of the condensation product in the shortest possible time, for example, within a period of 5 minutes and preferably within a period of 0.5 to 3 minutes otherwise the originally hydrophilic condensation product tends to polymerize and change into a hydrophobic product. By carrying out the concentrating step within the time period and under the conditions described above, it is possible to concentrate a solution initially comprising from 15 to 30% by weight of hydrophilic condensation product until it contains from about 70 to 95% by weight solids without substantially changing the hydrophilic nature of such condensation product and at the same time eliminate all but about 1.5% or less of the free formaldehyde and all but about 5% or less of unreacted methanol from the solution. Prolonged heating during the concentrating or evaporating step is to be avoided, however, since then the condensation product tends to polymerize and become water insoluble.

In practice the initial solution of condensation product is pumped through a suitable heat exchanger [of the type illustrated in Figure 15 (F) on page 1043 of Chemical Engineers' Handbook, 2nd Ed. (1941), published by McGraw-Hill Book Company, Inc., or a pipe of suitable length] which is heated by steam, liquid heating media and the like, wherein such solution is subjected to turbulent flow and is rapidly concentrated. When using steam as a heating medium, gauge pressures of from about 15 to 35 pounds per square inch have been found to be satisfactory. Gauge pressures below 15 pounds per square inch are not satisfactory since the rate of concentrating the solution is too slow. On the other hand, steam gauge pressures above 35 pounds per square inch tend to favor the formation of resinous scale which not only interfere with heat transmission but also necessitates removal of the scale periodically. Irrespective of the heating medium employed, however, the temperature of the solution being concentrated should not exceed about 125° C. and preferably should not drop below about 100° C. The amount of heat exchange surface required will vary considerably depending upon the rate of feed, the temperature of the heating medium and the desired solids content of the final solution. These factors should be so correlated that any small portion, say 35 pounds or less, of the feed solution is concentrated to approximately 70 to 95% by weight solids within the time period specified above and also enters and leaves the heat exchange surface within such period of time.

In a preferred embodiment of this invention the initial solution of the condensation product, which solution contains from about 15 to 30% by weight of the hydrophilic condensation product, is first heated under conditions of turbulent flow to a temperature sufficiently high to concentrate the solution to a solids content of 70 to 95% by weight within a period of 5 minutes, and preferably within a period of 0.5 to 3 minutes, while maintaining the interface of the solution in contact with the vapors evolved from the solution during the heating period, the temperature used being insufficient to convert the condensation product to a hydrophobe state. Thereafter the heating of the solution is discontinued. The temperature of the solution will generally be within the range of about 100 to 115° C. when the solution has reached the desired solids content of 70 to 95% by weight. Thus, the initial solution is heated under conditions of turbulent flow to a temperature between about 100 and 115° C. within a period of 5 minutes at such a rate that it is concentrated to a solids content of 70 to 95% by weight within such period of time while maintaining the vapors evolved from the solution by heating in intimate contact with the interface of the solution, after which the heating is discontinued before the condensation product is converted to the hydrophobe state. This is suitably accomplished, for example, by continuously bringing increments of the solution under conditions of turbulent flow into contact with a surface, such as the heat exchange surfaces described above, heated to a temperature equivalent to a gauge steam pressure of from about 15 to 35 pounds per square inch at the rate of about 10 to 35 pounds per minute and maintaining the solution in contact with the heated surface under conditions of turbulent flow until it is concentrated to a solids content of about 70 to 95% by weight. The temperature of the solution at this stage will be between about 100 and 115° C. as mentioned above. Under these conditions it is possible to concentrate the solution to a solids content of 70 to 95% by weight within a period of 5 minutes.

The highly concentrated solution leaving the heat exchange surface is separated almost immediately from the vapors associated therewith so as to prevent appreciable condensation of the vapors in or with the solution. This separation may be carried out in the heat exchanger itself when the solution can be removed quickly from the heating zone without prolonged heating. This separation of solution and vapors is also suitably carried out by passing the solution and vapors as they emerge from the heat exchange surfaces, directly into a centrifugal separator such as a cyclone separator [of the type illustrated on page 1864 of Chemical Engineers' Handbook, 2nd Ed. (1941), published by McGraw-Hill Book Company, Inc.]. In this case substantially complete separation of droplets of solution entrained in the vapor is effected by employing several separators in series. In order to prevent the concentrated solution of condensation product from building up on the walls of the heat exchanger or centrifugal separator, it is desirable to warm the walls sufficiently to allow the solution to flow freely. This may be accomplished by lagging or tracing the walls or by using jacketed means heated with a heating medium such as steam.

It is preferred to dilute the concentrated solution of condensation product with water or the water-miscible alcohols hereinbefore described to a solids content of about 70 to 80% by weight immediately after the concentrating step. Cooling the resulting solution to about room temperature is desirable in order to substantially prevent polymerization of the condensation product.

It is essential in the practice of the present invention that the initial aqueous solutions contain a hydrophilic condensation product. By "hydrophilic" is meant a water soluble condensation product or a condensation product which is at least sufficiently dispersed in water to yield a clear solution. Such condensation products may be prepared in various ways as described in the prior art. One suitable method of preparing melamine condensation products of this type is to first react melamine and formaldehyde, as formalin, in mol ratios of about 1:3 to about 1:6 in an alkaline reacting solution at a temperature between about 60 to 90° C. until the melamine is substantially dissolved. The methylating agent, which is preferably methanol, is then added to this solution. In general, from about 10 to 30 mols of methanol are employed for each mol of melamine used. The solution is then acidified to a pH between about 2 and 5 with a strong mineral acid such as phosphoric acid, hydrochloric acid and the like. This mixture is heated under reflux to a temperature between about 30 to 60° C. until a homogeneous solution is obtained whereupon it is neutralized to a pH between about 8 and 11 with an alkaline compound such as caustic potash, caustic soda and the like and then cooled. Precipitated salts formed by the neutralization of the mineral acid with the alkaline compound are preferably removed at this stage by filtration, centrifugation and the like.

Aqueous solutions of hydrophilic methyl ethers of melamine-formaldehyde condensation products or methyl ethers of methylol melamine, prepared as described immediately above, generally comprise between about 15 to 30% by weight solids which consist essentially of the condensation product together with water, free formaldehyde and methanol. It is to be understood that the foregoing procedure is given by way of example only. Still other procedures for preparing such solutions may also be employed as will be apparent to those skilled in the art.

Methyl ethers of urea-formaldehyde condensation products are prepared in a substantially similar manner except that it is not necessary to employ more than 2 to 4 mols of formaldehyde for each mol of urea employed. It is possible, in addition, to employ smaller amounts of methanol or other methylating agent in the preparation of the initial aqueous solution of methylated urea-formaldehyde condensation product than is possible in the preparation of the initial aqueous solution of methylated melamine-formaldehyde condensation products. However, it is still advisable to employ methanol in excess of the amount theoretically required to react with methylol urea since by employing an excess it is possible to complete the reaction quickly and before the methyl ethers of such methylol urea become hydrophobic.

A further understanding of the present invention will be obtained from the following specific examples which are not, however, intended to be limitative thereof, parts and percentages being by weight.

*Example I*

A hydrophilic methyl ether of melamine-formaldehyde was first prepared in the following manner.

One mol of melamine was reacted with about 4.5 mols of formaldehyde in the form of 37% neutral formalin under reflux at a pH of about 8.6 (glass electrode) at a temperature of 70° C. until the melamine was substantially dissolved. After a further reaction of about 5 minutes 20 mols of methanol were added and the pH was adjusted to 4.0 (glass electrode) with phosphoric acid. The reaction was then continued for an additional 15 minutes at a temperature of approximately 40° C. The pH of the solution was then adjusted to 10.5 (glass electrode) with NaOH. The resulting solution was then cooled and filtered and contained about 40% methanol, 24% condensation product, 2% free formaldehyde and 34% water.

The above solution was pumped through a heat exchanger which was jacketed and heated with 30 pounds per square inch of steam (gauge pressure). The entering solution was concentrated at atmospheric pressure to 95% solids content within 2 minutes and was at a temperature of 110° C. as it issued from the heat exchange surface. On leaving the heat exchange surface, the vapors and solution were immediately separated in a cyclone separator which was lagged to permit the solution to flow freely from its walls. The concentrated solution was then diluted with water until it contained approximately 75% solids and was cooled to about 25° C. The diluted solution was allowed to stand for about 24 hours after which it was filtered to remove any haze or cloud which had formed. The product may be marketed as such or may be diluted to a lower solids content. At 75% solids it was stable without clouding for a period of at least 6 months and was still capable of infinite dilution with water.

The 95% solids solution issuing from the heat exchange surfaces contained in addition to the condensation product about 1.5% free methanol and 0.3 free formaldehyde, the remaining liquid being water.

*Example II*

A hydrophilic methyl ether of urea-formaldehyde condensation product was first prepared as follows:

One mol of urea was first reacted with 4 mols of formaldehyde in the form of a 37% formalin solution under reflux at a pH of about 8.5 (glass electrode) and at a temperature of 70° C. until the urea was substantially dissolved. The reaction was continued for an additional 5 minutes and approximately 15 mols of methanol were added thereto and heating was continued until a homogeneous solution was obtained. The resulting solution was then acidified to a pH of 4.5 (glass electrode) with phosphoric acid. The reaction was carried out under reflux for an additional 25 minutes at a temperature of approximately 45° C. The pH of the solution was then adjusted to about 10.0 (glass electrode) with caustic soda after which the solution was cooled and filtered.

The resulting solution was pumped through a steam jacketed heat exchanger and heated with steam at 35 pounds per square inch (gauge pressure). The entering solution was concentrated to 90% solids content within 3 minutes and its temperature was about 100° C. when it emerged from the heat exchange surface. The vapors and concentrated solution were immediately separated, without any substantial condensation of vapors taking place, in a lagged cyclone separator. The concentrated solution was immediately diluted to about 75% solids content and then cooled to 30° C. The solution was stored at this temperature for 20 hours. The solution was then filtered to remove haze or cloud which had developed on standing. The resulting solution remained clear and stable for 6 months.

*Example III*

A solution of a hydrophilic methyl ether of melamine-formaldehyde condensation product was first prepared as described in the second paragraph of Example I and was then continuously pumped at the rate of 35 pounds per minute through a jacketed pipe about 70 feet long and having a mean internal diameter of about 1.5 inches, which pipe was heated by steam at a gauge pressure of 30 pounds per square inch. The solution was thus concentrated to a solids content of about 90% by weight under conditions of turbulent flow within a period of 3 minutes, while maintaining the vapors evolved from the solution in intimate contact with the interface of the solution. The solution emerging from the heated pipe was at a temperature of about 108° C. and was immediately separated from the vapors in contact therewith in a lagged cyclone separator.

The concentrated solution thus obtained contained about 0.5% free formaldehyde and 2.5% of free methanol, the remaining liquid being water. This solution was diluted with methanol until it contained 80% solids and then cooled to a temperature of 25° C., after which it was allowed to stand for 24 hours. The solution was then filtered to remove insoluble and haze-forming impurities therein. The filtered product was stable without clouding for a period of at least 6 months and was capable of being infinitely diluted with water at the end of such period without precipitation of the condensation product.

It is to be understood that the methods described herein are not limited to any particular types of apparatus or means for its successful operation. In general, types of apparatus referred to herein are only given by way of example and it will be obvious to those skilled in the art that a variety of heat exchanging means may be employed and a variety of separating means may be employed to separate the vapors and concentrated solution. Also, various changes and modifications of the methods described herein will be apparent to those skilled in the art to which this invention appertains without departing from the spirit and intent of this invention. It is intended, therefore, that the present invention be limited only by the scope of the present claims.

This application is a continuation-in-part of my co-pending application, Serial No. 62,420, filed November 27, 1948, now abandoned.

What is claimed is:

1. A method of preparing a clear, concentrated solution of hydrophilic methyl ethers of melamine-formaldehyde condensation products which comprises heating under conditions of turbulent flow an alkaline reacting solution consisting essentially of water, free formaldehyde, unreacted methanol and from about 15 to 30% by weight of solids which consist essentially of hydrophilic methyl ethers of melamine-formaldehyde condensation products at a rate sufficient to raise the temperature of the solution between about 100 and 115° C. and to concentrate the solution to a solids content of about 70 to 95% by weight within a period of 5 minutes while maintaining the interface of the solution in intimate contact with the vapors evolved from the solution during the heating period, discontinuing the heating of the solution before the condensation product is converted to the hydrophobe state, separating the solution from the vapors in contact therewith prior to appreciable condensation of the vapor, for a period of at least 12 hours at a concentration of 70 to 85% by weight of solids and then separating the water-insoluble impurities in the solution from the remainder of the solution.

2. A method according to claim 1, but further characterized in that the final solution is allowed to stand for a period of at least 24 hours and thereafter is filtered to remove water-insoluble impurities therein.

3. A method of preparing a clear, concentrated solution of hydrophilic methyl ethers of urea-formaldehyde condensation products which comprises heating under conditions of turbulent flow an alkaline reacting solution consisting essentially of water, free formaldehyde, unreacted methanol and from about 15 to 30% by weight of solids which consist essentially of hydrophilic methyl ethers of urea-formaldehyde condensation products at a rate sufficient to raise the temperature of the solution between about 100 and 115° C. and to concentrate the solution to a solids content of about 70 to 95% by weight within a period of 5 minutes while maintaining the interface of the solution in intimate contact with the vapors evolved during the heating of the solution, discontinuing the heating of the solution before the condensation product therein is converted to the hydrophobe state, separating the solution from the vapors in contact therewith before appreciable condensation of the vapors occurs, allowing the solution to stand for a period of at least 12 hours at a concentration of 70 to 85% by weight of solids and then separating the water-insoluble impurities in the solution from the remainder of the solution.

4. A method of preparing a clear, concentrated solution of a condensation product which comprises continuously passing an alkaline reacting solution consisting essentially of water, free formaldehyde, unreacted methanol and from about 15 to 30% by weight of solids which consist essentially of hydrophilic methyl ethers of melamine-formaldehyde condensation product into a heated cylindrical passageway at the rate of about 10 to 35 pounds per minute under conditions of turbulent flow while maintaining the vapors evolved from said solution in intimate contact with the interface of the solution, said passageway being heated to a temperature equivalent to a steam gauge pressure between 15 and 35 pounds per square inch, maintaining the solution in the heated passageway under conditions of turbulent flow until the temperature of the solution is between about 100 and 115° C. and the solution has been concentrated to a solids content between about 70 and 95% by weight but not exceeding 3 minutes, continuously removing the solution from the heated passageway before the condensation product is converted to the hydrophobe state, continuously separating the solution from the vapors in contact therewith before appreciable condensation of the vapors occurs, diluting the solution which contains more than 85% by weight of solids with a liquid of the class consisting of water and water-miscible alcohols until the solution contains between about 70 and 85% by weight of solids, allowing the solution to stand for a period of at least 12 hours and thereafter separating the water-insoluble impurities in the solution from the remainder of the solution.

5. A method according to claim 4, but further characterized in that the final solution is allowed to stand for a period of at least 24 hours and thereafter is filtered to remove water-insoluble impurities therefrom.

6. A method according to claim 5, but further characterized in that the liquid used in diluting the solution in the preparation of the final solution is water.

7. A method of preparing a clear, concentrated solution of hydrophilic methyl ethers of melamine-formaldehyde or methyl ethers of urea-formaldehyde condensation products which comprises heating under conditions of turbulent flow an alkaline reacting solution consisting essentially of water, free formaldehyde, unreacted methylating agent and less than 70% by weight of solids which consist essentially of a hydrophilic condensation product selected from the group consisting of hydrophilic methyl ethers of melamine-formaldehyde condensation products, hydrophilic methyl ethers of urea-formaldehyde condensation products and mixtures of such condensation products, to a temperature of at least 100° C. but not in excess of 125° C. until the solution is concentrated to a solids content of about 70 to 95% by weight within a period of 5 minutes while maintaining the interface of the solution in intimate contact with the vapors evolved from the solution during the heating period, discontinuing the heating of the solution before the reaction product is converted to the hydrophobe state, separating the solution from the vapors in contact therewith before appreciable amounts of the vapor condense, allowing the solution to stand for a period of at least 12 hours at a concentration of about 70 to 85% by weight of solids and then separating the water-insoluble impurities in the solution from the remainder of the solution.

8. A method as in claim 1, but further characterized in that the concentrated solution which contains more than 85% by weight of solids is diluted to a concentration of 70 to 85% by weight of solids with water before it is allowed to stand for at least 12 hours.

9. A method of preparing a clear, concentrated solution of a condensation product which comprises continuously bringing an alkaline reacting solution consisting essentially of water, free formaldehyde, unreacted methanol and from about 15 to 30% by weight of solids which consist essentially of a condensation product selected from the group consisting of hydrophilic methyl ethers of melamine-formaldehyde condensation products, hydrophilic methyl ethers of urea-formaldehyde condensation products and mixtures of said condensation products into contact with a heated surface under conditions of turbulent flow at the rate of about 10 to 35 pounds per minute while maintaining the vapors evolved from said solution in intimate contact with the interface of the solution, the temperature of the heated surface being equivalent to a steam gauge pressure between 15 and 35 pounds per square inch, maintaining the solution in contact with the heated surface under conditions of turbulent flow until the temperature of the solution is between about 100 and 115° C. and the solution is concentrated to a solids content between about 70 and 95% by weight but not exceeding 5 minutes, continuously removing the solution from contact with the heated surface before the condensation product therein is converted to the hydrophobe state, continuously separating the solution from the vapors in contact therewith prior to appreciable condensation of the vapors, allowing the solution to stand for at least 12 hours at a concentration of 70 to 85% by weight of solids and thereafter separating the water-insoluble impurities in the solution from the remainder of the solution.

FRANCIS A. BONZAGNI.

References Cited in the file of this patent

UNITED STATES PATENTS

| Number | Name | Date |
|---|---|---|
| 438,787 | Wheeler | Oct. 21, 1890 |
| 2,191,957 | Edgar | Feb. 27, 1940 |
| 2,213,921 | Sorenson | Sept. 3, 1940 |
| 2,309,412 | Muskat | Jan. 26, 1943 |
| 2,529,856 | West | Nov. 14, 1950 |

FOREIGN PATENTS

| Number | Country | Date |
|---|---|---|
| 890,760 | France | Nov. 19, 1943 |